(12) United States Patent
Song et al.

(10) Patent No.: US 11,551,693 B2
(45) Date of Patent: Jan. 10, 2023

(54) METHOD OF MAN-MACHINE INTERACTION AND ELECTRONIC DEVICE

(71) Applicant: AI SPEECH CO., LTD., Jiangsu (CN)

(72) Inventors: Hongbo Song, Suzhou (CN); Chengya Zhu, Suzhou (CN); Weisi Shi, Suzhou (CN); Shuai Fan, Suzhou (CN)

(73) Assignee: AI SPEECH CO., LTD., Jiangsu (CN)

( * ) Notice: Subject to any disclaimer, the term of this patent is extended or adjusted under 35 U.S.C. 154(b) by 0 days.

(21) Appl. No.: 17/616,969

(22) PCT Filed: Nov. 25, 2019

(86) PCT No.: PCT/CN2019/120607
§ 371 (c)(1),
(2) Date: Dec. 6, 2021

(87) PCT Pub. No.: WO2020/248524
PCT Pub. Date: Dec. 17, 2020

(65) Prior Publication Data
US 2022/0165269 A1    May 26, 2022

(30) Foreign Application Priority Data

Jun. 13, 2019  (CN) .......................... 201910510000.9

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/30* (2013.01); *G10L 15/183* (2013.01); *G10L 15/1822* (2013.01); *G10L 2015/225* (2013.01)

(58) Field of Classification Search
CPC combination set(s) only.
See application file for complete search history.

(56) References Cited

U.S. PATENT DOCUMENTS

| 5,774,859 A | 6/1998 | Houser et al. |
| 2019/0286996 A1 | 9/2019 | Tian et al. |
| 2020/0005780 A1 | 1/2020 | Lu |

FOREIGN PATENT DOCUMENTS

| CN | 103413549 A | 11/2013 |
| CN | 105070290 A | 11/2015 |

(Continued)

OTHER PUBLICATIONS

Third Office Action from The State Intellectual Property Office of People's Republic of China issued in Chinese Application No. 201610510000.9, dated Dec. 20, 2021.
(Continued)

*Primary Examiner* — Vu B Hang
(74) *Attorney, Agent, or Firm* — Harness, Dickey & Pierce, P.L.C.; Stephen T. Olson

(57) ABSTRACT

An embodiment of the present invention provides a method of man-machine interaction, including: receiving first audio uploaded by a user through a client end, marking a start time and an end time of the first audio, and generating a first recognition result of the first audio using an audio decoder; determining whether the first audio is a short speech based on the start time and end time thereof, and in case of a short speech, generating a second recognition result of the second audio using the audio decoder upon receiving the second audio uploaded by the client end within a preset heartbeat protection time range, sending at least the first recognition result and the second recognition result to a language prediction model; and if it is determined that a combination of the recognition results constitutes a sentence, generating an answering instruction corresponding to the sentence, and sending the answering instruction together with a feedback time mark of the answering instruction to the client end. Unreasonable sentence segmentation in a full-duplex dia-
(Continued)

logue scenario and redundant replies in the dialogue can thereby be avoided.

10 Claims, 4 Drawing Sheets

(51) Int. Cl.
*G10L 15/30* (2013.01)
*G10L 15/18* (2013.01)
*G10L 15/183* (2013.01)

(56) References Cited

FOREIGN PATENT DOCUMENTS

| CN | 106469212 A | 3/2017 |
|---|---|---|
| CN | 107066568 A | 8/2017 |
| CN | 107920120 A | 4/2018 |
| CN | 108237616 A | 7/2018 |
| CN | 108882111 A | 11/2018 |
| CN | 108920604 A | 11/2018 |
| CN | 109147779 A | 1/2019 |
| CN | 109147831 A | 1/2019 |
| CN | 109215642 A | 1/2019 |
| CN | 109584876 A | 4/2019 |
| CN | 109741753 A | 5/2019 |
| CN | 110223697 A | 9/2019 |
| JP | 2004309631 A | 11/2004 |

OTHER PUBLICATIONS

Sound Card, Chapter 9, p. 119, English and Chinese.
International Search Report (English and Chinese) and Written Opinion of the ISA (WIPO English translation and Chinese) issued in PCT/CN2019/120607, dated Mar. 12, 2020; ISA/CN.
First Search Report issued in Chinese Application No. 2019105100009, dated Dec. 29, 2020.
Supplementary Search Report issued in Chinese Application No. 2019105100009, dated Jul. 8, 2021.
First Office Action from The State Intellectual Property Office of People's Republic of China issued in Chinese Application No. 201910510000.9, dated Jan. 6, 2021.
Second Office Action from The State Intellectual Property Office of People's Republic of China issued in Chinese Application No. 201610510000.9, dated Jul. 16, 2021.

METHOD OF MAN-MACHINE INTERACTION AND ELECTRONIC DEVICE

CROSS-REFERENCE TO RELATED APPLICATIONS

This application is a U.S. National Phase Application under 35 U.S.C. 371 of International Application No. PCT/CN2019/120607, filed on Nov. 25, 2019, which claims the benefit of Chinese Patent Application No. 201910510000.9, filed on Jun. 13, 2019. The entire disclosures of the above applications are incorporated herein by reference.

TECHNICAL FIELD

The present invention relates to the field of intelligent voice dialogues, and in particular to a method of man-machine interaction and an electronic device.

BACKGROUND

In a general question and answer system, one question is usually followed by one answer, or multiple rounds of interaction are performed. It is desirable for full-duplex interaction to achieve the same effect as making a phone call between people, which is not only limited to a question-and-answer manner, but also involve such a situation that a robot answers once after a user speaks a few words. The robot can even take the initiative to ask questions to facilitate the interaction, and apply the rhythm control technology which adjust its own sentence length according to the length and content of the user's sentence.

The inventor found at least the following problems in the related art:

1. Giving an irrelevant answer. When a response is made by a conventional device, sentences reaching a client end will be continuously broadcast. When network delay or processing delay of a server is significant, loss of timeliness will occur for a response reaching the client end. Since measurement of response to the client end is completely implemented at the server, the client end does not have a strategy for implementing relative time alignment, and cannot selectively discard certain responses to maintain the same session state as the server. If a user has already started a next round of input, and the client end continuously broadcasts multiple pieces of previous input, the input and output will not correspond to each other, that is, an irrelevant answer will be given, resulting in poor user experience.

2. Unreasonable sentence segmentation. On one hand, a user's speaking rhythm will be different in different scenarios. If sentence segmentation is performed merely relying on acoustic features, such a situation will occur in which a corresponding question is responded in advance before a user finishes speaking, or the user has to wait for a long time after finishing speaking. On the other hand, a discontinuous audio upload will cause a server unable to accurately determine an actual interval between two sentences, and hence unable to determine whether the long interval between the two sentences is caused by network delay, resulting in a situation where the response content cannot be reasonably decided.

SUMMARY

An object of the present invention is to solve at least one of the problems in the prior art, such as that an output content is not an appropriate response to an input content during a dialogue due to lack of timeliness of the answer, and that content of response cannot be reasonably decided due to unreasonable sentence segmentation caused by the discontinuity of a first and a second audio.

In a first aspect, an embodiment of the present invention provides a method of man-machine interaction being applicable to a server. The method includes:

receiving a first audio uploaded by a user through a client end, marking a start time and an end time of the first audio, and generating a first recognition result of the first audio using an audio decoder;

determining whether the first audio is a short speech based on the start time and end time of the first audio, and in case of a short speech, if a second audio uploaded by the client end is received within a preset heartbeat protection time range, generating a second recognition result of the second audio by using the audio decoder;

sending the first recognition result and the second recognition result to a language prediction model to determine whether a combination of the first recognition result and the second recognition result constitutes a sentence; and if it is determined that the combination constitutes a sentence, generating an answering instruction corresponding to the sentence, and sending the answering instruction together with a feedback time mark of the answering instruction to the client end to complete the man-machine interaction, wherein the feedback time mark includes the start time and the end time of the sentence corresponding to the answering instruction.

In a second aspect, an embodiment of the present invention provides a method of man-machine interaction. The method is applied to a client and includes:

continuously uploading first audio and second audio input by a user to a server, wherein a start time and an end time of the audio are used as an input time mark;

receiving successively an answering instruction sent by the server and a feedback time mark corresponding to the answering instruction, and identifying the audio input by the user corresponding to the answering instruction by matching the input time mark with the feedback time mark;

determining whether the answering instruction has timed out based on a time offset between the input time mark of the audio input by the user and the current time of the client end; and if it is determined that the answering instruction has timed out, discarding the answering instruction; and if it is determined that the answering instruction does not time out, feeding back the answering instruction to the user to complete the man-machine interaction.

In a third aspect, an embodiment of the present invention provides a method of man-machine interaction being applicable to a voice dialogue platform including a server and a client, and the method includes:

continuously uploading, by the client end, first audio and second audio input by a user to the server, wherein a start time and an end time of the audios are used as input time marks;

receiving, by the server, the first audio uploaded by the user through the client end, marking the start time and the end time of the first audio, and generating a first recognition result of the first audio by using an audio decoder;

determining, by the server, whether the first audio is a short speech based on the start time and the end time of the first audio, and in case of a short speech, if the server receives the second audio uploaded by the client end within a preset heartbeat protection time range, generating a second recognition result of the second audio by using the audio decoder;

sending, by the server, at least the first recognition result and the second recognition result to a language prediction model to determine whether a combination of the recognition results constitutes a sentence;

if it is determined that the combination constitutes a sentence, generating, by the server, an answering instruction corresponding to the constituted sentence, and sending the answering instruction together with a feedback time mark of the answering instruction to the client end, wherein the feedback time mark includes the start time and the end time of the sentence corresponding to the answering instruction;

receiving, by the client end, the answering instruction sent by the server and the feedback time mark corresponding to the answering instruction, and determining an audio input by the user which is corresponding to the answering instruction by matching the input time mark with the feedback time mark;

determining, by the client end, whether the answering instruction has timed out based on a time offset between the input time mark of the audio input by the user and the current time of the client end; and if it is determined that the answering instruction has timed out, discarding the answering instruction; and if it is determined that the answering instruction does not time out, feeding back the answering instruction to the user to complete the man-machine interaction.

In a fourth aspect, an embodiment of the present invention provides a system of man-machine interaction being applicable to a server and including:

a recognition and decoding program module configured to receive a first audio uploaded by a user through a client end, mark a start time and an end time of the first audio, and generate a first recognition result of the first audio by using an audio decoder;

a short speech determining program module configured to determine whether the first audio is a short speech based on the start time and end time of the first audio, and in case of a short speech, if a second audio uploaded by the client is received within a preset heartbeat protection time range, generate a second recognition result of the second audio by using the audio decoder;

a sentence determining program module configured to send at least the first recognition result and the second recognition result to a language prediction model to determine whether a combination of the recognition results constitutes a sentence; and if it is determined that the sentence is constituted, generate an answering instruction corresponding to the combined sentence, and send the answering instruction together with a feedback time mark of the answering instruction to the client end to complete the man-machine interaction, wherein the feedback time mark includes the start time and the end time of the sentence corresponding to the answering instruction.

In a fifth aspect, an embodiment of the present invention provides a system of man-machine interaction which is applied to a client end and includes:

an audio uploading program module configured to enable a continuous uploading of a first audio and a second audio input by a user to a server, wherein a start time and an end time of the audios are used as an input time mark;

an audio matching program module configured to enable the server to receive successively an answering instruction and a feedback time mark corresponding to the answering instruction, and determine the audio input corresponding to the answering instruction from the first audio and the second audio input by matching the input time mark with the feedback time mark;

a man-machine interaction program module configured to determine whether the answering instruction has timed out based on a time offset between the input time mark of the audio input by the user and the current time of the client end; and if it is determined that the answering instruction has timed out, discard the answering instruction, or otherwise feed back the answering instruction to the user to complete the man-machine interaction.

In a sixth aspect, an embodiment of the present invention provides a system of man-machine interaction which is applicable to a voice dialogue platform including a server and a client end and includes:

an audio uploading program module configured to enable the client end to continuously upload a first audio and a second audio input by a user to the server, wherein a start time and an end time of the audios are used as an input time mark;

a recognition and decoding program module configured to enable the server to receive the first audio uploaded by the user through the client end, mark the start time and the end time of the first audio, and generate a first recognition result of the first audio by using an audio decoder;

a short speech determining program module configured to enable the server to determine whether the first audio is a short speech based on the start time and the end time of the first audio, and in case of a short speech, if the server receives the second audio uploaded by the client end within a preset heartbeat protection time range, generate a second recognition result of the second audio by using the audio decoder;

a sentence determining program module configured to enable the server to send at least the first recognition result and the second recognition result to a language prediction model to determine whether a combination of the recognition results constitutes a sentence; and if it is determined that a sentence is constituted, enable the server to generate an answering instruction corresponding to the combined sentence, and send the answering instruction together with a feedback time mark of the answering instruction to the client end, wherein the feedback time mark includes the start time and the end time of the sentence corresponding to the answering instruction;

an audio matching program module configured to receive, by the client end, the answering instruction sent by the server and the feedback time mark corresponding to the answering instruction, and determine an audio input by the user which is corresponding to the answering instruction by matching the input time mark with the feedback time mark;

a man-machine interaction program module configured to enable the client end to determine whether the answering instruction has timed out based on a time offset between the input time mark of the audio input by the user and the current time of the client; and if it is determined that the answering instruction has timed out, discard the answering instruction, or otherwise feed back the answering instruction to the user to complete the man-machine interaction.

In a seventh aspect, an electronic device is provided. The electronic device includes: at least one processor, and a memory communicatively connected with the at least one processor, wherein the memory stores instructions executable by the at least one processor, and the instructions, when being executed by the at least one processor, cause the at least one processor to perform the steps of the method of man-machine interaction of any afore-mentioned embodiments of the present invention.

In an eighth aspect, an embodiment of the present invention provides a storage medium in which a computer program is stored, wherein the program, when being executed by a processor, performs the steps of the method of man-machine interaction of any afore-mentioned embodiments of the present invention.

The following beneficial effects can be obtained from the afore-mentioned embodiments of the present invention. While it is determined that a first speaking from a user is a short speech, a time interval of two pieces of speaking is processed by using a heartbeat event so that unreasonable sentence segmentation in the context of full-duplex dialogue can be avoided after ensuring that the two pieces of speaking can be combined into a complete sentence. A match between audio input by the user with an answering instruction returned by a server can be realized based on a start time and an end time of recording the audio to ensure making an exact answer to the user. On this basis, by setting different time offsets to deal with different situations in the interaction between the user and an intelligent voice device, the problem of redundant reply in the full-duplex dialogue is solved.

BRIEF DESCRIPTION OF THE DRAWINGS

In order to explain the technical solutions in the embodiments of the present invention or in the prior art more clearly, a brief introduction of the drawings that need to be used in the description of the embodiments or the prior art will be given in the following. Obviously, the drawings only show some embodiments of the present invention. Those of ordinary skill in the art can also obtain other drawings based on these drawings without creative work.

DETAILED DESCRIPTION

In order to make the objectives, technical solutions, and advantages of the embodiments of the present invention clearer, the embodiments of the present invention will be described below in conjunction with the accompanying drawings in the embodiments of the present invention. The described embodiments are part of the embodiments of the present invention, rather than all of the embodiments. Based on the embodiments of the present invention, all other embodiments obtained by those skilled in the art without creative work shall fall within the protection scope of the present invention.

Figure 1:
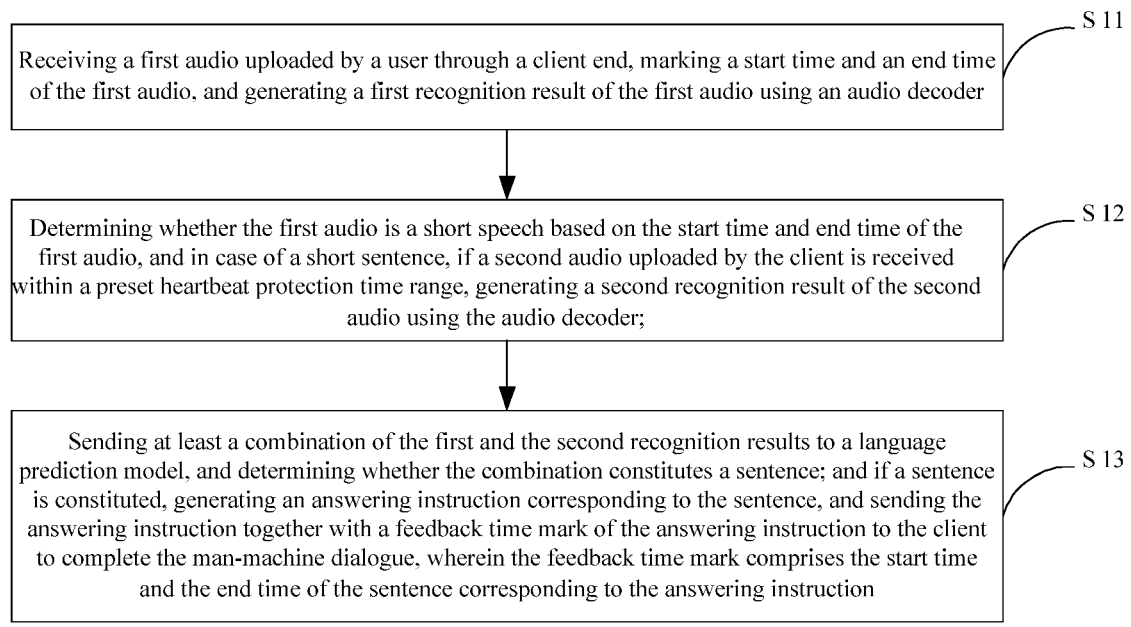
FIG. 1 is a flowchart of a method of man-machine interaction applied to a server according to an embodiment of the present invention.

FIG. 1 is a flowchart of a method of man-machine interaction according to an embodiment of the present invention. The method is applied to a server and includes the following steps.

In step S11, upon receiving a first audio uploaded by a user through a client end, a start time and an end time of the first audio are marked, and a first recognition result of the first audio is generated by using an audio decoder.

In step S12, whether the first audio is a short speech is determined based on the start time and the end time of the first audio. If it is a a short speech, and if a second audio uploaded by the client end is received within a preset heartbeat protection time range, a second recognition result of the second audio is generated by using the audio decoder.

In step S13, at least the first recognition result and the second recognition result are sent to a language prediction model, and whether a combination of the first recognition result and the second recognition result constitutes a sentence is determined. If it is determined that the combination constitutes a sentence, an answering instruction corresponding to the constituted sentence is generated, and the answering instruction and a feedback time mark of the answering instruction are sent to the client end to complete the man-machine interaction. The feedback time mark includes the start time and the end time of the sentence corresponding to the answering instruction.

In this embodiment, an existing full-duplex dialogue between a user and an intelligent device involves the following scenario.

User: I want to listen to (followed by a short pause) Jay Chou's song.

Intelligent voice device: What do you want to listen to?

Intelligent voice device: Jay Chou's Rice Fragrance will be played.

Here, "I want to listen to" said by the user is an incomplete sentence, but the intelligent voice device still makes a response to "I want to listen to", rendering addition of a meaningless dialogue. The method provided in this embodiment can prevent the intelligent voice device from making a meaningless reply to incomplete sentences having a short pause, such as "I want to listen to".

For step S11, similarly, when the user said "I want to listen to (followed by a short pause) Jay Chou's song", because a short pause exists after "I want to listen to", it is determined as a first audio, and "Jay Chou's song" is determined as a second audio. The server receives the first audio "I want to listen to" uploaded by the user through the intelligent voice device (client end), marks a start time and an end time of the first audio, and generates a first recognition result of the first audio by using an audio decoder.

For step S12, whether the first audio is a short speech is determined based on the start time and the end time of the first audio. For example, since the length of recording is proportional to a duration, a relative duration of received audio can be calculated according to the size of the audio, and then audio with a short speaking duration can be determined as a short speech. For example, "I want to listen to" is a short speech. When it is determined that the first audio is a short speech, receipt of the second audio uploaded by the client end within the preset heartbeat protection time range indicates that the "first audio" is not finished. The heartbeat protection time is commonly used in heartbeat detection in network programs. For example, when no data interaction exists between the client end and the server for a while, heartbeat detection needs to be performed to confirm whether the other party is alive. The heartbeat detection can be initiated by the client end or the server.

For step S13, at least a combination "I want to listen to Jay Chou's song" of the first recognition result "I want to listen to" and the second recognition result "Jay Chou's song" is sent to a language model to determine whether the combined sentence is a complete sentence.

It is determined according to the language model that "I want to listen to Jay Chou's song" is a complete sentence, and then an answering instruction corresponding to "I want to listen to Jay Chou's song" is generated. The answering instruction together with a feedback time mark of the answering instruction is sent to the client end to complete the man-machine interaction. (The feedback time mark is intended to solve the problem of providing an irrelevant answer to a question, which will be explained in the following embodiments.)

It can be seen from this embodiment that when it is determined that a sentence spoken by a user first is a short speech, a time interval between two sentences is processed with a heartbeat event, ensuring that the two sentences can be combined into a complete sentence, thereby avoiding inappropriate sentence segmentation in the full-duplex dialogue scenario.

Alternatively, in this embodiment, after determining whether the combined sentence is a sentence, the method may further include the following steps.

If it is determined that the combined sentence is not a complete sentence, generating a first answering instruction corresponding to the first recognition result and a second answering instruction corresponding to the second recognition result respectively, and sending the first answering instruction and the second answering instruction together with the corresponding feedback time marks to the client end.

In this embodiment, in the case that the first recognition result and the second recognition result cannot be combined into the same sentence, since the contents of the two sentences are not related, the problem of inappropriate sentence segmentation is not involved. Then, the first answering instruction corresponding to the first recognition result and the second answering instruction corresponding to the second recognition result are respectively generated and sent to the client end together with their respective feedback time marks.

In this embodiment, when two sentences are irrelevant, each dialogue of the user has a corresponding answer, which ensures the stable operation of the full-duplex dialogue.

In some embodiments, the present application also provides a server including at least one processor and a memory communicatively connected with the at least one processor. The memory stores instructions executable by at least one processor to enable the at least one processor to perform the steps of:

receiving a first audio uploaded by a user through a client end, marking a start time and an end time of the first audio, and generating a first recognition result of the first audio by using an audio decoder;

determining whether the first audio is a short speech based on the start time and end time of the first audio, and in case of a short speech, if a second audio uploaded by the client end is received within a preset heartbeat protection time range, generating a second recognition result of the second audio by using the audio decoder;

sending at least the first recognition result and the second recognition result to a language prediction model to determine whether a combination of the two recognition results constitutes a sentence; and if it is determined that a sentence is constituted, generating an answering instruction corresponding to the sentence, and sending the answering instruction together with a feedback time mark of the answering instruction to the client end to complete the man-machine interaction, wherein the feedback time mark includes the start time and the end time of the sentence corresponding to the answering instruction.

In some embodiments, the at least one processor of the server according to the present application is further configured to:

generate a first answering instruction corresponding to the first recognition result and a second answering instruction corresponding to the second recognition result respectively, if it is determined that a combination of the two recognition results does not constitute a sentence, and send the first and the second answering instructions together with the corresponding feedback time marks to the client end.

Figure 2:
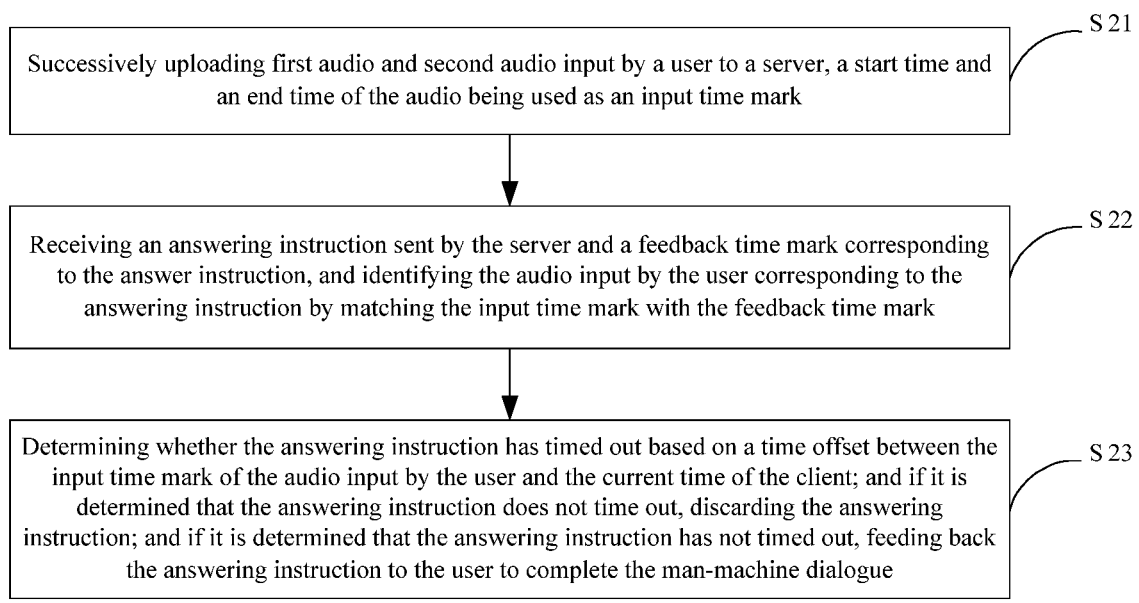
FIG. 2 is a flowchart of a method of man-machine interaction applied to a client end according to an embodiment of the present invention.

FIG. 2 is a flowchart of a method of man-machine interaction according to an embodiment of the present invention. The method is applied to a client end and includes the following steps.

In step S21, a first audio and a second audio input by a user are continuously uploaded to a server, and a start time and an end time of each audio are used as an input time mark.

In step S22, an answering instruction sent by the server and a feedback time mark corresponding to the answering instruction are received successively, and the audio input by the user corresponding to the answering instruction is determined by matching the input time mark with the feedback time mark.

In step S23, whether the answering instruction has timed out is determined based on a time offset between the input time mark of the audio input by the user and the current time of the client end, and if it is determined that the answering instruction has timed out, the answering instruction is discarded; and if it is determined that the answering instruction does not time out, the answering instruction is fed back to the user to complete the man-machine interaction.

In this embodiment, a full-duplex dialogue between a user and an intelligent device may also have the following scenario.

User: I want to listen to a song
User: Rice Fragrance by Jay Chou
Intelligent voice device: whose song do you want to listen to?
Intelligent voice device: Jay Chou's song Rice Fragrance will be played.

Here, the user added a second sentence after a first sentence. However, since the order of replies corresponds to input contents and the user inputs the following sentence too fast, the second sentence input by the user is actually the same as the response of the intelligent voice device to the first sentence, making the first sentence output by the intelligent voice device redundant. In order to avoid the above situation, this method has been adjusted as follows.

For step S21, similarly, when the user said "I want to listen to a song" and "Rice Fragrance by Jay Chou", they will be successfully transmitted to the server sequentially. At the same time, a start time and an end time of the audios recorded locally are used as an input time mark.

For step S22, since both "I want to listen to a song" and "Rice Fragrance by Jay Chou" said by the user are complete sentences, two answering instructions and feedback time marks fed back by the server will be received. In this embodiment, since two complete sentences are input, two instructions will be received. If the sentence example used in the first embodiment is used in this method applied to a client end, one instruction will be received. For a full-duplex dialogue, the client end needs to know which input sentence corresponds to the answering instruction returned by the server, and therefore performs matching with the previous time mark.

For step S23, an offset of the current time of the client end can be adjusted according to specific situations. For example, in a full-duplex dialogue, two situations exist.

In a first situation, referring to the above embodiment, the user's second sentence input subsequently already implies the content of the first reply sentence of the intelligent voice device, making the first reply sentence meaningless. In other words, after the second sentence is input, even if the first sentence has not been answered, there is no need to reply to the first sentence. In this case, the time offset is set to be related to the input time of the second sentence.

In a second situation, two consecutive sentences input by the user are irrelevant, such as "What time is it" and "Order a meal for me". In this case, the intelligent voice device replies in sequence, and the content of the first reply and the content of the second reply will not affect each other.

Accordingly, the server will involve a complex process due to the questions input by the user, which will take a long time. Or, there may be a long delay for the server to send the processed answering instruction to the client end (e.g., 2 minutes, which will seriously affect user experience in a full-duplex dialogue) due to unstable network. However, such a long-delayed answering instruction already becomes senseless. In this case, the time offset is set to be related to a preset reply waiting time (which is a common set and will not be described in detail in this description).

Therefore, different settings can be made for the offset of the current time of the client end according to different situations.

When the offset of the current time of the client end is set based on the first situation, it is determined according to the time offset that the answering instruction of the first sentence has timed out, and will be discarded. In this way, redundant replies can be avoided.

1. User: I want to listen to a song
2. User: Rice Fragrance by Jay Chou

Intelligent voice device: whose song do you want to listen to? (which will be discarded and not output to the user)

3. Intelligent voice device: Rice Fragrance by Jay Chou will be played.

It can be seen from this embodiment that a match between the audio input by the user and the answering instructions returned by the server is realized by the start time and the end time of the recording audio, which ensures the accuracy of the answer to the user. On this basis, the problem of redundant reply in the full-duplex dialogue is solved by setting different time offsets to deal with various situations in the interaction between the user and the intelligent voice device.

In some embodiments, the present application also provides a client end. The client end includes at least one processor and a memory communicatively connected with the at least one processor. The memory stores instructions executable by at least one processor to enable the at least one processor to perform the steps of:

continuously uploading first audio and second audio input by a user to a server, wherein a start time and an end time of the audios are used as input time marks;

receiving an answering instruction sent by the server and a feedback time mark corresponding to the answering instruction, and identifying the audio input by the user corresponding to the answering instruction by matching the input time mark with the feedback time mark;

determining whether the answering instruction has timed out according to a time offset between the input time mark of the audio input by the user and the current time of the client end; and if it is determined that the answering instruction has timed out, discarding the answering instruction; and if it is determined that the answering instruction does not time out, feeding back the answering instruction to the user to complete the man-machine interaction.

Figure 3:
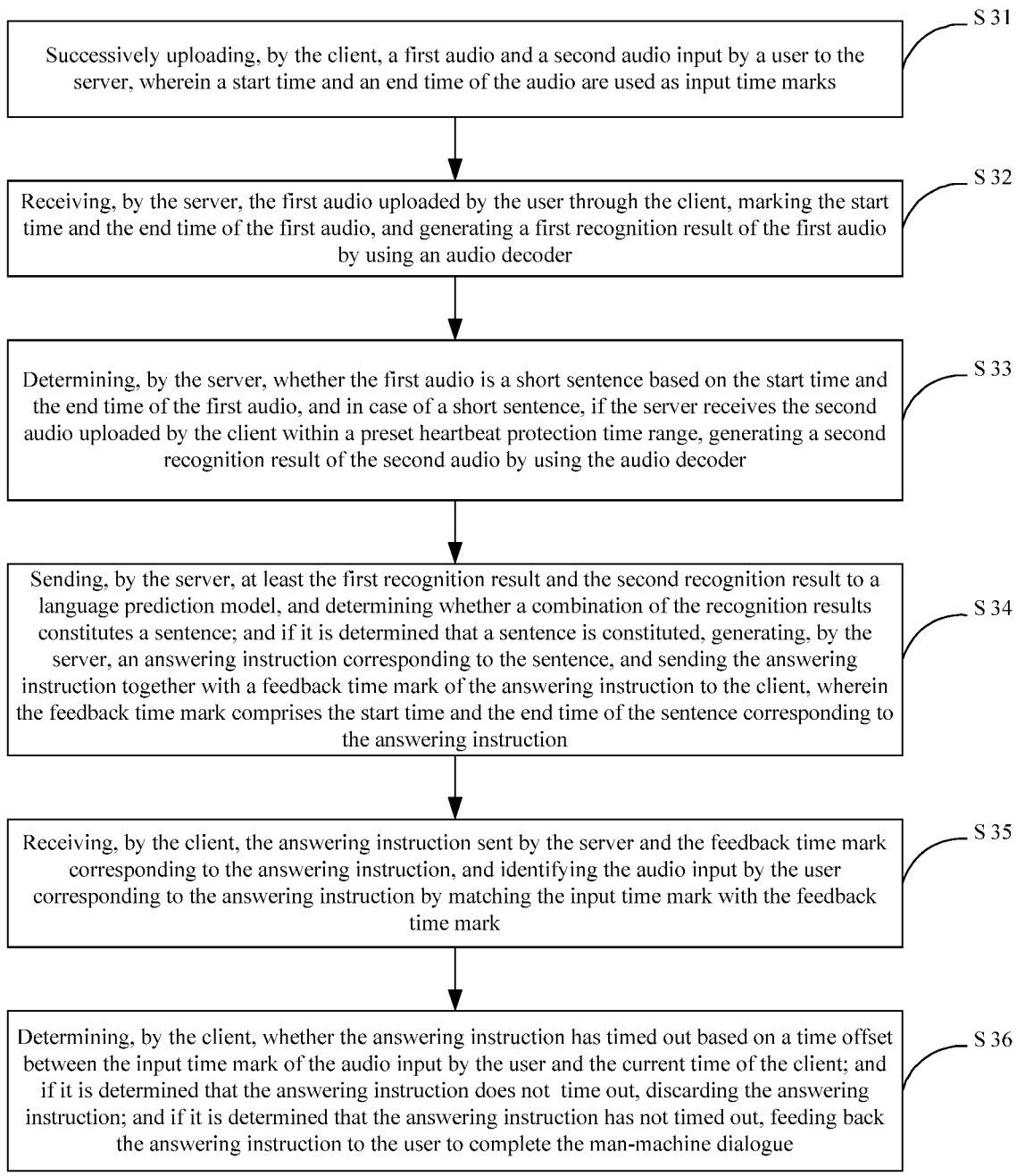
FIG. 3 is a flowchart of a method of man-machine interaction applied to a voice dialogue platform according to an embodiment of the present invention.

FIG. 3 is a flowchart of a method of man-machine interaction according to an embodiment of the present invention. The method is applicable to a voice dialogue platform and includes the following steps.

In step S31, a client end successively uploads a first audio and a second audio input by a user to a server, and uses a start time and an end time of the audios as input time marks.

In step S32, the server receives the first audio uploaded by the user through the client end, marks the start time and the end time of the first audio, and generates a first recognition result of the first audio by using an audio decoder.

In step S33, the server determines whether the first audio is a short speech based on the start time and the end time thereof, and in case of a short speech, if the server receives the second audio uploaded by the client end within a preset heartbeat protection time range, generates a second recognition result of the second audio, i.e., a second sentence by the audio decoder.

In step S34, the server sends at least the first recognition result and the second recognition result to a language prediction model to determine whether the combination of the first and the second recognition results constitutes a sentence. If it is determined that the combination constitutes a sentence, the server generates an answering instruction corresponding to the sentence, and sends the answering instruction together with a feedback time mark of the answering instruction to the client end. Here, the feedback time mark includes the start time and the end time of the sentence corresponding to the answering instruction.

In step S35, the client end receives the answering instruction sent by the server and the feedback time mark corresponding to the answering instruction, and determines the audio input by the user corresponding to the answering instruction by matching the input time mark with the feedback time mark.

In step S36, the client end determines whether the answering instruction has timed out according to a time offset between the input time mark and the current time of the client end. If it is determined that the answering instruction has timed out, the answering instruction is abandoned; and if it is determined that the answering instruction does not time out, the answering instruction is fed back to the user to complete the man-machine interaction.

In this embodiment, after determining whether the combination constitutes a sentence, the method further includes the following steps as an implementation.

If it is determined that the combination does not constitute a sentence, the server generates a first answering instruction corresponding to the first recognition result and a second answering instruction corresponding to the second recognition result respectively, and sends the first answering instruction and the second answering instruction together with the corresponding feedback time marks to the client end.

The client end receives the first answering instruction and the second answering instruction from the server and the feedback time marks corresponding to the answering instructions, and determines the audio input by the user corresponding to the answering instructions by matching the input time mark with the feedback time mark.

The client end determines whether the answering instruction has timed out according to a time offset between the input time mark of the audio input by the user and the current time of the client end.

If it is determined that the answering instruction has timed out, the answering instruction is discarded; and if it is determined that the answering instruction does not time out, the answering instruction is fed back to the user to complete the man-machine interaction.

In this embodiment, the client end and the server are applied to a voice dialogue platform as an implementation entity. The specific implementation steps have been described in the above embodiments, and will not be repeated here.

It can be seen from this embodiment that when it is determined that a sentence first spoken by a user is a short speech, a time interval between two sentences is processed with a heartbeat event, and it is further determined that the two sentences can be combined into a complete sentence, thereby solving the problem of unreasonable sentence segmentation in a full-duplex dialogue scenario. A match between the audio input by the user and the answering instruction returned by the server is realized by the start time and the end time of recording audio, which ensures the accuracy of the answer to the user. On this basis, the problem of redundant reply in a full-duplex dialogue is solved by setting different time offsets to deal with various situations in the interaction between the user and the intelligent voice device.

In some embodiments, the present application also provides a voice dialogue platform. The voice dialogue platform includes a server and a client end, and includes at least one processor and a memory communicatively connected with the at least one processor. The memory stores instructions executable by the at least one processor to enable the at least one processor to perform the following steps.

The client end uploads a first audio and a second audio input by a user successively to the server, wherein a start time and an end time of the audios are used as input time marks.

The server receives the first audio uploaded by the user through the client end, marks the start time and the end time of the first audio, and generating a first recognition result of the first audio by using an audio decoder.

The server determines whether the first audio is a short speech based on the start time and the end time of the first audio. In case that it is a short speech, if the server further receives the second audio uploaded by the client end within a preset heartbeat protection time range, the server generates a second recognition result of the second audio by using the audio decoder.

Then, the server sends the first recognition result and the second recognition result to a language prediction model to determine whether a combination of the first recognition result and the second recognition result constitutes a sentence.

If it is determined that the combination constitutes a sentence, the server generates an answering instruction corresponding to the combined sentence, and sends the answering instruction together with a feedback time mark of the answering instruction to the client end. The feedback time mark includes the start time and the end time of the sentence corresponding to the answering instruction.

The client end receives the answering instruction sent by the server and the feedback time mark corresponding to the answering instruction, and identifies the audio input by the user corresponding to the answering instruction by matching the input time mark with the feedback time mark;

The client end further determines whether the answering instruction has timed out based on a time offset between the input time mark of the audio input by the user and the current time of the client end.

If it is determined that the answering instruction has timed out, the client end discards the answering instruction; and if it is determined that the answering instruction does not time out, the client end feeds back the answering instruction to the user to complete the man-machine interaction.

In some embodiments, the at least one processor of the voice dialogue platform according to the present application is further configured as follows.

If it is determined that the combination of the recognition result does not constitute a sentence, a first answering instruction corresponding to the first recognition result and a second answering instruction corresponding to the second recognition result are generated by the server respectively and are sent to the client end together with the corresponding feedback time marks.

The client end, upon receiving the first answering instruction and the second answering instruction sent by the server and the feedback time marks corresponding to the answering instructions, determines the audio input by the user corresponding to the answering instruction by matching the input time mark with the feedback time mark.

The client end determines whether the answering instruction has timed out based on a time offset between the input time mark of the audio input by the user and the current time of the client end.

If it is determined that the answering instruction has timed out, the answering instruction is discarded; and if it is determined that the answering instruction does not time out, the answering instruction is sent to the user to complete the man-machine interaction.

Figure 4:
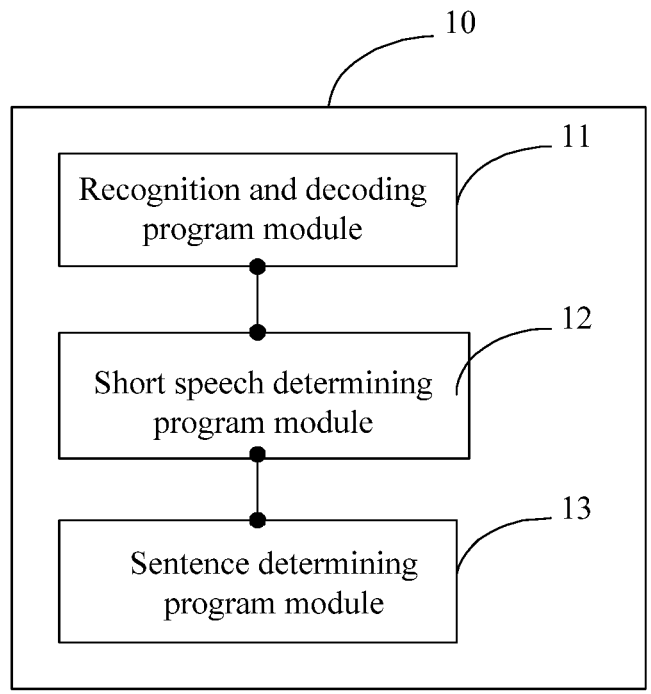
FIG. 4 is a schematic structural diagram of a system of man-machine interaction applied to a server according to an embodiment of the present invention.

FIG. 4 is a schematic structural diagram of a system of man-machine interaction according to an embodiment of the present invention. The system may execute the method of man-machine interaction of any of the above embodiments and is disposed in a terminal.

The system of man-machine interaction in this embodiment is applicable to a server, and includes a recognition and decoding program module 11, a short speech determining program module 12, and a sentence determining program module 13.

The recognition and decoding program module 11 is configured to receive a first audio uploaded by a user through a client end, mark a start time and an end time of the first audio, and generate a first recognition result of the first audio by using an audio decoder. The short speech determining program module 12 is configured to determine whether the first audio is a short speech based on the start time and end time thereof, and in case of a short speech and a second audio uploaded by the client end is received within a preset heartbeat protection time range, generate a second recognition result of the second audio by using the audio decoder. The sentence determining program module 13 is configured to send at least the first recognition result and the second recognition result to a language prediction model to determine whether a combination of the recognition results constitutes a sentence; and if it is determined a sentence is constituted, generate an answering instruction corresponding to the combined sentence and send the answering instruction together with a feedback time mark of the answering instruction to the client end to complete the man-machine interaction. The feedback time mark includes the start time and the end time of the sentence corresponding to the answering instruction.

Further, after determining whether the combined sentence is a sentence, the sentence determining program module is further configured as follows.

If it is determined that the combined sentence is not a sentence, a first answering instruction corresponding to the first recognition result and a second answering instruction corresponding to the second recognition result are generated respectively and sent to the client end with the corresponding feedback time marks.

Figure 5:
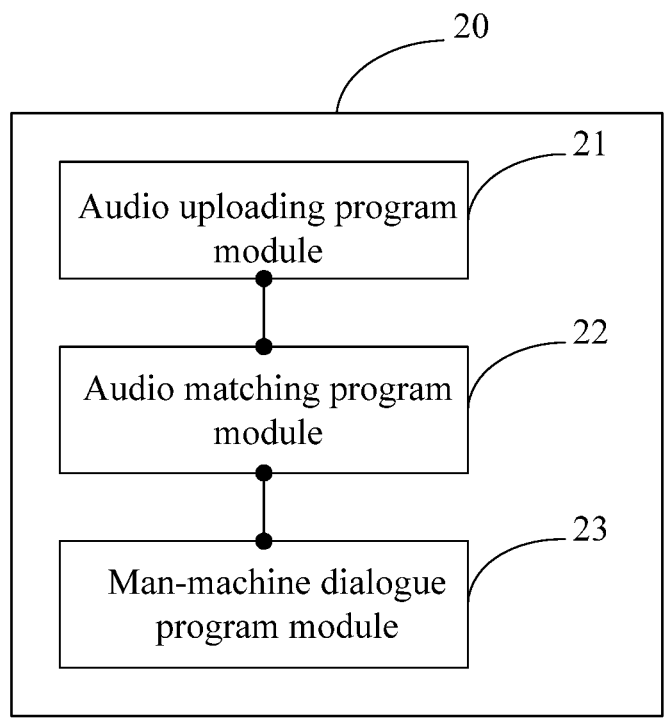
FIG. 5 is a schematic structural diagram of a system of man-machine interaction applied to a client end according to an embodiment of the present invention.

FIG. 5 is a schematic structural diagram of a system of man-machine interaction according to an embodiment of the present invention. The system may execute the method of man-machine interaction of any of the above embodiments and is disposed in a terminal.

The system of man-machine interaction in this embodiment is applicable to a client end, and includes an audio uploading program module 21, an audio matching program module 22, and a man-machine interaction program module 23.

The audio uploading program module 21 is configured to continuously upload a first audio and second audio input by a user to a server, wherein a start time and an end time of the audio are used as an input time mark. The audio matching program module 22 is configured to successively receive an answering instruction sent by the server and a feedback time mark corresponding to the answering instruction, and determine the audio input by the user corresponding to the answering instruction by matching the input time mark with the feedback time mark. The man-machine interaction program module 23 is configured to determine whether the answering instruction has timed out according to a time offset between the input time mark of the audio input by the user and the current time of the client end, and discard the answering instruction in case of time out; or send the answering instruction to the user to complete the man-machine interaction if it is determined that the answering instruction does not time out.

Figure 6:
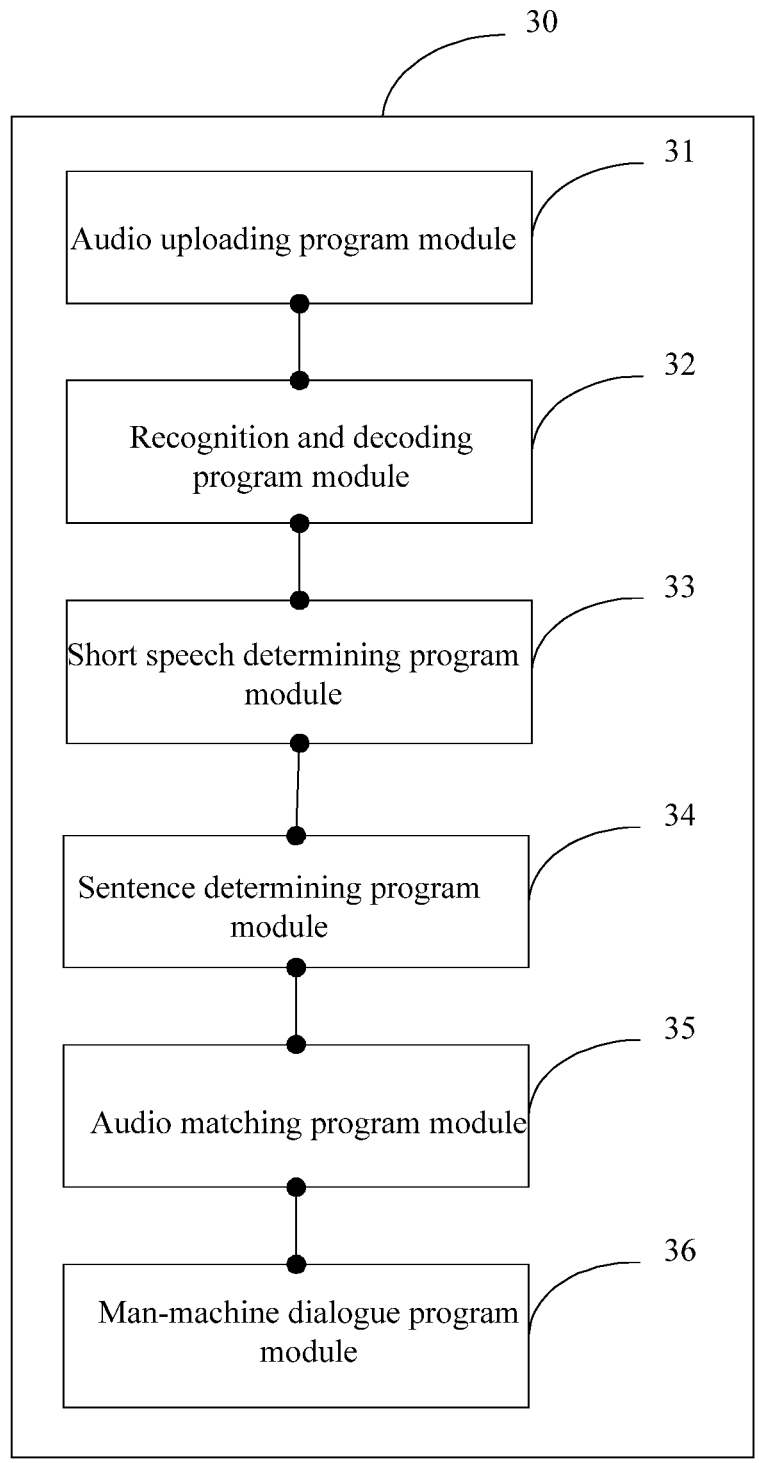
FIG. 6 is a schematic structural diagram of a system of man-machine interaction applied to a voice dialogue platform according to an embodiment of the present invention.

FIG. 6 is a schematic structural diagram of a system of man-machine interaction according to an embodiment of the present invention. The system may execute the method of man-machine interaction of any of the above embodiments and is disposed in a terminal.

The system of man-machine interaction in this embodiment is applicable to a voice dialogue platform. The voice dialogue platform includes a server and a client end, and includes an audio uploading program module 31, a recognition and decoding program module 32, a short speech determining program module 33, a sentence determining program module 34, an audio matching program module 35 and a man-machine interaction program module 36.

The audio uploading program module 31 is configured to enable the client end to continuously upload a first audio and a second audio input by a user to the server, wherein a start time and an end time of the audio are used as an input time mark. The recognition and decoding program module 32 is configured to enable the server to receive the first audio uploaded by the user through the client end, mark the start time and the end time of the first audio, and generate a first recognition result of the first audio by using an audio decoder. The short speech determining program module 33 is configured to enable the server to determine whether the first audio is a short speech based on the start time and the end time of the first audio, and in case of a short speech and upon receiving the second audio uploaded by the client end within a preset heartbeat protection time range, generate a second recognition result of the second audio by using the audio decoder. The sentence determining program module 34 is configured to enable the server to send at least the first recognition result and the second recognition result to a language prediction model to determine whether a combination of the recognition results constitutes a sentence, and enable the server to generate an answering instruction corresponding to the combined sentence if it is determined that the combination of the recognition results constitutes a sentence, and to send the answering instruction together with a feedback time mark of the answering instruction to the client end, wherein the feedback time mark includes the start time and the end time of the sentence corresponding to the answering instruction. The audio matching program module 35 is configured to enable the client end to receive the answering instruction sent by the server and the feedback time mark corresponding to the answering instruction, and determine the audio input by the user corresponding to the answering instruction by matching the input time mark with the feedback time mark. The man-machine interaction program module 36 is configured to enable the client end to determine whether the answering instruction has timed out according to a time offset between the input time mark of the audio input by the user and the current time of the client end, and to discard the answering instruction if timed out, or to send the answering instruction to the user to complete the man-machine interaction if not timed out.

Further, in this embodiment, the short speech determining program module is configured to, after determining whether the combination of the recognition results constitutes a sentence, enable the server to generate a first answering instruction corresponding to the first recognition result and a second answering instruction corresponding to the second recognition result respectively if it is determined that the combined sentence is not a complete sentence, and send the first answering instruction and the second answering instruction together with the corresponding feedback time marks to the client end.

The audio matching program module is configured to enable the client end to receive the first answering instruction and the second answering instruction sent by the server and the feedback time marks corresponding to the answering instructions, and to determine the audio input by the user corresponding to the answering instructions by matching the input time mark with the feedback time mark.

The man-machine interaction program module is configured to enable the client end to determine whether the answering instructions have timed out based on a time offset between the input time mark of the audio input by the user and the current time of the client end, and to discard the answering instructions if timed out, or send the answering instructions to the user to complete the man-machine interaction if not timed out.

An embodiment of the present invention also provides a non-volatile computer storage medium. The computer storage medium stores computer-executable instructions which may execute the method of man-machine interaction in any of the above method embodiments.

As an implementation, the non-volatile computer storage medium according to the present invention stores computer executable instructions, and the computer executable instructions are configured to:

enable a client end to continuously upload a first audio and second audio input by a user to a server, wherein a start time and an end time of the audio are used as an input time mark;

enable the server to receive the first audio uploaded by the user through the client end, marking the start time and the end time of the first audio, and generate a first recognition result of the first audio by using an audio decoder;

enable the server to determine whether the first audio is a short speech based on the start time and the end time of the first audio, and in case of a short speech and upon receiving the second audio uploaded by the client end within a preset heartbeat protection time range, generate a second recognition result of the second audio by using the audio decoder;

enable the server to enter at least the first recognition result and the second recognition result into a language prediction model to determine whether a combination of the first and the second recognition results constitutes a sentence;

enable the server to generate an answering instruction corresponding to the combined sentence, and send the answering instruction together with a feedback time mark thereof to the client end, wherein the feedback time mark includes the start time and the end time of the sentence corresponding to the answering instruction;

enable the client end to receive the answering instruction sent by the server and the feedback time mark corresponding to the answering instruction, and determine the audio input by the user corresponding to the answering instruction by matching the input time mark with the feedback time mark;

enable the client end to determine whether the answering instruction has timed out based on a time offset between the input time mark of the audio input by the user and the current time of the client end; and enable the client end to the answering instruction if it is determined that the answering instruction has timed out, or send the answering instruction to the user to complete the man-machine interaction if it is determined that the answering instruction does not time out.

As a non-volatile computer-readable storage medium, it can be used to store non-volatile software programs, non-volatile computer executable programs, and modules, such as program instructions/modules corresponding to the human-machine dialogue method in the embodiments of the present application. One or more program instructions are stored in the non-volatile computer-readable storage medium, and can perform any one of the above human-computer dialogue methods of the above method embodiments when executed by a processor.

The non-volatile computer-readable storage medium may include a storage program area and a storage data area. The storage program area may store an operating system and application programs required by at least one function. The storage data area may store data generated according to the use of a human-machine dialogue device and the like. In addition, the non-volatile computer-readable storage medium may include a high-speed random access memory, and may also include a non-volatile memory, such as at least one magnetic disk storage device, a flash memory device, or other non-volatile solid-state storage devices. In some embodiments, the non-volatile computer-readable storage medium may optionally include memories remotely disposed with respect to the processor, and these remote memories may be connected to the human-machine dialogue device through a network. Examples of the above network include but are not limited to the internet, intranet, local area network, mobile communication network, and combinations thereof.

The client end in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with voice interaction function.

In this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A method of man-machine interaction, applied to a server, comprising:
   receiving a first audio uploaded by a user through a client end, marking a start time and an end time of the first audio, and generating a first recognition result of the first audio by using an audio decoder;
   determining whether the first audio is a short speech based on the start time and end time of the first audio, and in case of a short speech, if a second audio uploaded by the client end is received within a preset heartbeat protection time range, generating a second recognition result of the second audio by using the audio decoder;
   sending at least the first recognition result and the second recognition result to a language prediction model to determine whether a combination of the first and the second recognition results constitutes a sentence; and
   if it is determined that a sentence is constituted, generating an answering instruction corresponding to the sentence, and sending the answering instruction together with a feedback time mark of the answering instruction to the client end to complete the man-machine interaction, wherein the feedback time mark comprises the start time and the end time of the sentence corresponding to the answering instruction.

2. The method according to claim 1, wherein after determining the combination of the first and the second recognition results constitutes a sentence, the method further comprises:
   if it is determined that combination of the first and the second recognition results does not constitute a sentence, generating a first answering instruction corresponding to the first recognition result and a second answering instruction corresponding to the second recognition result respectively, and sending the first answering instruction and the second answering instruction together with the corresponding feedback time marks to the client end.

3. A method of man-machine interaction, applied to a client end, comprising:
   successively uploading a first audio and a second audio input by a user to a server, wherein a start time and an end time of the audio are used as input time marks;
   sequentially receiving an answering instruction sent by the server and a feedback time mark corresponding to the answering instruction, and identifying the audio input by the user corresponding to the answering instruction by matching the input time mark with the feedback time mark;
   determining whether the answering instruction has timed out based on a time offset between the input time mark of the audio input by the user and the current time of the client end; and
   if it is determined that the answering instruction has timed out, discarding the answering instruction; and if it is determined that the answering instruction does not time out, feeding back the answering instruction to the user to complete the man-machine interaction.

4. A method of man-machine interaction, applied to a voice dialogue platform, the voice dialogue platform comprising a server and a client end, and the method comprising:
   successively uploading, by the client end, a first audio and a second audio input by a user to the server, wherein a start time and an end time of the audio are used as input time marks;
   receiving, by the server, the first audio uploaded by the user through the client end, marking the start time and the end time of the first audio, and generating a first recognition result of the first audio by using an audio decoder;
   determining, by the server, whether the first audio is a short speech based on the start time and the end time of the first audio, and in case of a short speech, if the server receives the second audio uploaded by the client end within a preset heartbeat protection time range, generating a second recognition result of the second audio by using the audio decoder;
   sending, by the server, at least the first recognition result and the second recognition result to a language prediction model to determine whether a combination of the first and the second recognition results constitutes a sentence;
   if it is determined that the combination of the first and the second recognition results constitutes a sentence, generating, by the server, an answering instruction corresponding to the combined sentence, and sending the answering instruction together with a feedback time mark of the answering instruction to the client end, wherein the feedback time mark comprises the start time and the end time of the sentence corresponding to the answering instruction;
   receiving, by the client end, the answering instruction sent by the server and the feedback time mark corresponding to the answering instruction, and identifying the audio input by the user corresponding to the answering instruction by matching the input time mark with the feedback time mark;
   determining, by the client end, whether the answering instruction has timed out based on a time offset between the input time mark of the audio input by the user and the current time of the client end; and
   if it is determined that the answering instruction has timed out, discarding the answering instruction; and if it is determined that the answering instruction does not time out, feeding back the answering instruction to the user to complete the man-machine interaction.

5. The method according to claim 4, wherein after determining whether the combination is a sentence, the method further comprises:
   if it is determined that the combination of the first and the second recognition results does not constitute a sentence, generating, by the server, a first answering instruction corresponding to the first recognition result and a second answering instruction corresponding to the second recognition result respectively, and sending the first answering instruction and the second answering instruction together with the corresponding feedback time marks to the client end;
   receiving, by the client end, the first answering instruction and the second answering instruction sent by the server and the feedback time marks corresponding to the answering instructions, and identifying the audio input by the user corresponding to the answering instructions by matching the input time mark with the feedback time marks;
   determining, by the client end, whether the answering instructions have timed out based on a time offset between the input time mark of the audio input by the user and the current time of the client end; and
   if it is determined that the answering instructions have timed out, discarding the answering instructions; and if it is determined that the answering instructions have not timed out, feeding back the answering instructions to the user to complete the man-machine interaction.

6. A server, comprising: at least one processor, and a memory communicatively connected with the at least one processor, wherein the memory stores instructions executable by the at least one processor, and the instructions, when being executed by the at least one processor, cause the at least one processor to perform the steps of:

receiving a first audio uploaded by a user through a client end, marking a start time and an end time of the first audio, and generating a first recognition result of the first audio by using an audio decoder;

determining whether the first audio is a short speech based on the start time and end time of the first audio, and in case of a short speech, if second audio uploaded by the client end is received within a preset heartbeat protection time range, generating a second recognition result of the second audio by using the audio decoder;

sending at least the first recognition result and the second recognition result to a language prediction model to determine whether a combination of the first and the second recognition results constitutes a sentence; and if it is determined that combination of the first and the second recognition results constitutes a sentence, generating an answering instruction corresponding to the sentence, and sending the answering instruction together with a feedback time mark of the answering instruction to the client end to complete the man-machine interaction, wherein the feedback time mark comprises the start time and the end time of the sentence corresponding to the answering instruction.

7. The server according to claim 6, wherein the at least one processor is further configured to:

if it is determined that the combination of the first and the second recognition results does not constitute a sentence, generate a first answering instruction corresponding to the first recognition result and a second answering instruction corresponding to the second recognition result respectively, and send the first answering instruction and the second answering instruction together with the corresponding feedback time marks to the client end.

8. A client end, comprising: at least one processor, and a memory communicatively connected with the at least one processor, wherein the memory stores instructions executable by the at least one processor, and the instructions, when being executed by the at least one processor, cause the at least one processor to perform the steps of:

successively uploading a first audio and second audio input by a user to a server, wherein a start time and an end time of the audio are used as an input time mark;

receiving an answering instruction sent by the server and a feedback time mark corresponding to the answering instruction, and identifying the audio input by the user corresponding to the answering instruction by matching the input time mark with the feedback time mark;

determining whether the answering instruction has timed out based on a time offset between the input time mark of the audio input by the user and the current time of the client end; and if it is determined that the answering instruction has timed out, discarding the answering instruction; and if it is determined that the answering instruction does not time out, feeding back the answering instruction to the user to complete the man-machine interaction.

9. A voice dialogue platform, comprising a server and a client end, and comprising: at least one processor, and a memory communicatively connected with the at least one processor, wherein the memory stores instructions executable by the at least one processor, and the instructions, when being executed by the at least one processor, cause the at least one processor to perform the steps of:

continuously uploading, by the client end, a first audio and a second audio input by a user to the server, wherein a start time and an end time of the audio are used as input time marks;

receiving, by the server, the first audio uploaded by the user through the client end, marking the start time and the end time of the first audio, and generating a first recognition result of the first audio by using an audio decoder;

determining, by the server, whether the first audio is a short speech based on the start time and the end time of the first audio, and in case of a short speech, if the server receives the second audio uploaded by the client end within a preset heartbeat protection time range, generating a second recognition result of the second audio by using the audio decoder;

sending, by the server, at least the first recognition result and the second recognition result to a language prediction model to determine whether a combination of the first and the second recognition results constitutes a sentence;

if it is determined that the combination of the first and the second recognition results constitutes sentence, generating, by the server, an answering instruction corresponding to the combined sentence, and sending the answering instruction together with a feedback time mark of the answering instruction to the client end, wherein the feedback time mark comprises the start time and the end time of the sentence corresponding to the answering instruction;

receiving, by the client end, the answering instruction sent by the server and the feedback time mark corresponding to the answering instruction, and identifying the audio input by the user corresponding to the answering instruction by matching the input time mark with the feedback time mark;

determining, by the client end, whether the answering instruction has timed out based on a time offset between the input time mark of the audio input by the user and the current time of the client end; and if it is determined that the answering instruction has timed out, discarding the answering instruction; and if it is determined that the answering instruction does not time out, feeding back the answering instruction to the user to complete the man-machine interaction.

10. The voice dialogue platform according to claim 9, wherein the at least one processor is further configured to:

if it is determined that the combination of the first and the second recognition results does not constitute a sentence, generate, by the server, a first answering instruction corresponding to the first recognition result and a second answering instruction corresponding to the second recognition result respectively, and send the first answering instruction and the second answering instruction together with the corresponding feedback time marks to the client end;

receive, by the client end, the first answering instruction and the second answering instruction sent by the server and the feedback time marks corresponding to the answering instructions, and identify the audio input by the user corresponding to the answering instruction by matching the input time mark with the feedback time mark;

determine, by the client end, whether the answering instruction has timed out based on a time offset between the input time mark of the audio input by the user and the current time of the client end; and if it is determined that the answering instruction has timed out, discard the answering instruction; and if it is determined that the answering instruction does not time out, feedback the answering instruction to the user to complete the man-machine interaction.

\* \* \* \* \*